US010532345B2

United States Patent
Maury et al.

(10) Patent No.: US 10,532,345 B2
(45) Date of Patent: Jan. 14, 2020

(54) METHOD FOR PREPARING COBALT-BASED CATALYSTS

(71) Applicant: IFP Energies Nouvelles, Rueil-Malmaison (FR)

(72) Inventors: Sylvie Maury, Mornant (FR); Adrien Berliet, Lyons (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 22 days.

(21) Appl. No.: 15/941,306

(22) Filed: Mar. 30, 2018

(65) Prior Publication Data
US 2018/0280939 A1  Oct. 4, 2018

(30) Foreign Application Priority Data

Mar. 30, 2017  (FR) ..................... 17 52676

(51) Int. Cl.
| | |
|---|---|
| *B01J 35/08* | (2006.01) |
| *B01J 37/16* | (2006.01) |
| *B01J 37/18* | (2006.01) |
| *B01J 23/75* | (2006.01) |
| *B01J 37/02* | (2006.01) |
| *B01J 37/08* | (2006.01) |
| *B01J 35/00* | (2006.01) |
| *C10G 2/00* | (2006.01) |

(52) U.S. Cl.
CPC ........... *B01J 23/75* (2013.01); *B01J 35/0006* (2013.01); *B01J 37/024* (2013.01); *B01J 37/0236* (2013.01); *B01J 37/088* (2013.01); *C10G 2/332* (2013.01)

(58) Field of Classification Search
CPC ...... B01J 23/75; B01J 35/0006; B01J 35/006; B01J 35/023; B01J 35/08; B01J 35/1019; B01J 35/1042; B01J 37/0205; B01J 37/0236; B01J 37/024; B01J 37/088; B01J 37/16; B01J 37/18; C10G 2/332

USPC ............................................ 502/325; 518/715
See application file for complete search history.

(56) References Cited

U.S. PATENT DOCUMENTS

| | | | | |
|---|---|---|---|---|
| 5,639,798 | A * | 6/1997 | Wilson ....................... | B01J 8/22 502/308 |
| 6,638,889 | B1 * | 10/2003 | Van Berge ............... | B01J 23/75 502/300 |
| 6,753,351 | B2 * | 6/2004 | Clark ....................... | B01J 23/75 208/106 |
| 8,394,864 | B2 * | 3/2013 | Van De Loosdrecht | B01J 23/75 518/715 |
| 9,180,435 | B2 | 11/2015 | Maury et al. | |
| 2003/0144367 | A1 * | 7/2003 | Jacobus Van Berge | B01J 23/75 518/715 |
| 2003/0211940 | A1 * | 11/2003 | Van Berge ............... | B01J 23/75 502/325 |
| 2005/0227866 | A1 | 10/2005 | Berge et al. | |
| 2013/0324623 | A1 | 12/2013 | Maury et al. | |

FOREIGN PATENT DOCUMENTS

FR  2991199 A1  12/2013

OTHER PUBLICATIONS

Search Report dated Nov. 13, 2017 issued in corresponding FR 1752676 application (2 pages).

* cited by examiner

*Primary Examiner* — Patricia L. Hailey
(74) *Attorney, Agent, or Firm* — Millen, White, Zelano & Branigan, PC; Ryan Pool

(57) ABSTRACT

The invention has as its object a method for preparation of catalysts based on cobalt substrates, implementing a concatenation of stages for impregnation, drying and calcination under particular conditions.

The invention also relates to the use of said catalysts in Fischer-Tropsch synthesis methods.

20 Claims, No Drawings

METHOD FOR PREPARING COBALT-BASED CATALYSTS

TECHNICAL FIELD

The technical field of the invention is that of the preparation of catalysts based on cobalt substrates that can be used for carrying out the synthesis of hydrocarbons starting from a gas mixture that comprises carbon monoxide and hydrogen.

STATE OF THE ART

The Fischer-Tropsch synthesis methods make it possible to obtain a wide range of hydrocarbon fractions starting from the CO+H2 mixture that is commonly called synthesis gas. The overall equation of the Fischer-Tropsch synthesis can be written in the following manner:

$$nCO+(2n+1)H2 \rightarrow CnH2n+2+nH2O$$

This synthesis is at the core of the methods for conversion of natural gas, carbon or biomass into fuels or into intermediate products for the chemical industry. These methods are called GtL (Gas to Liquids in English terminology) in the case of the use of natural gas as an initial feedstock, CtL (Coal to Liquids in English terminology) for carbon, and BtL (Biomass to Liquids in English terminology) for the biomass. In each of these cases, the initial feedstock is first carbonated to form synthesis gas, a mixture of carbon monoxide and dihydrogen. The synthesis gas is then purified, and the H2/CO ratio is adjusted based on the catalyst and the method used for the Fischer-Tropsch synthesis. The synthesis gas is then transformed for the most part into paraffins that can then be transformed into fuels by a hydroisomerization-hydrocracking method. For example, transformation methods such as hydrocracking, dewaxing and hydroisomerization of the heavy fractions (C16+) make it possible to produce various types of fuels within the range of middle distillates: gas oil (180-370° C. fraction) and kerosene (140-300° C. fraction). The lighter C5-C15 fractions can be distilled and used as solvents.

The Fischer-Tropsch synthesis reaction can be carried out in various types of reactors (fixed bed, moving bed, or three-phase bed (gas, liquid, solid)), for example in a bubble-column-type reactor, and the products of the reaction have in particular the characteristic of being free of sulfur-containing, nitrogen-containing or aromatic-type compounds.

The conventional methods for preparation of catalysts with metal substrates that are used for the Fischer-Tropsch synthesis consist in depositing a metal salt or a metal-ligand coordination complex on the substrate, and then in carrying out one or more heat treatment(s) that is/are carried out in air, followed by a reducing treatment that is carried out ex-situ or in-situ.

The catalysts that are used for the Fischer-Tropsch synthesis are essentially cobalt- or iron-based catalysts, even if other metals such as ruthenium or nickel can be used. Nevertheless, the cobalt and the iron remain the metals that offer the best compromise to date in terms of performances/cost.

The catalytic properties (activity, selectivity, stability) depend greatly on the size of cobalt crystallites that are present on the surface of the substrate. Various methods make it possible to control the size of the crystallites. Thus, the use of various precursor salts of cobalt (nitrate, acetate, carbonate . . . ), complexing additives during the impregnation of these salts, substrates of different natures (feedstocks of surface, texture, hydroxylation rate . . . ), and impregnation solvents of various polarities make it possible to vary the size and the size distribution of the metal greatly. The monitoring of the drying and calcination conditions (temperature, duration, nature of the gas used and its flow rate, pressure) also makes it possible to obtain cobalt oxide crystallites of variable sizes.

The application WO 2010/097754 describes a method for preparation of catalysts by impregnation with a solution that contains an organic cobalt salt followed by another impregnation with a solution that contains an inorganic cobalt salt. Said method makes it possible to obtain catalysts that have an improved dispersion of cobalt crystallites as well as a better activity. The examples that are described in the application clearly show that in the case where the cobalt is added by two successive impregnations of the same inorganic salt, the activity in relation to the Fischer-Tropsch reaction is less favorable. Finally, no mention of the C5+ selectivity is made in this document.

The applicant has, surprisingly enough, discovered that a method that implements a concatenation of impregnation, drying and calcination stages under particular conditions makes it possible to obtain a precatalyst, which once activated by reduction, has improved catalytic performances for the Fischer-Tropsch synthesis reaction.

SUMMARY DESCRIPTION OF THE INVENTION

The invention has as its object a method for preparation of a precatalyst that contains a porous substrate and cobalt in oxide form, with the cobalt content being between 5 and 40% by weight in relation to the weight of the precatalyst, with said method comprising at least the following stages:

A first stage a) for impregnation of the porous substrate, by bringing at least one solution that comprises at least one inorganic cobalt precursor into contact at a temperature of between 5 and 40° C., with said impregnation making possible the deposition of 2 to 15% by weight of cobalt in relation to the final weight of the precatalyst, A first stage b) for drying the intermediate precatalyst that is obtained at the end of the impregnation stage a), with said drying being implemented in the presence of a gas that comprises air and/or an inert gas, with a flow rate of gas per hour and per gram of intermediate precatalyst that is obtained from stage a) (GHSV) of between 0.1 and 1.5 Nl/h/g, and at a temperature of between 60 and 110° C., A first stage c) for calcination of the intermediate precatalyst that is obtained at the end of stage b), said calcination is implemented in the presence of a gas that comprises air and/or an inert gas, with a flow rate of gas per hour and per gram of intermediate precatalyst that is obtained from stage b) (GHSV) of between 0.1 and 1.5 Nl/h/g, and at a temperature of between 200 and 550° C., A stage d) for final impregnation of the intermediate precatalyst that is obtained at the end of a preceding calcination stage, by the bringing into contact of said intermediate precatalyst with at least one solution that comprises at least one inorganic cobalt precursor at a temperature of between 5 and 40° C., with said impregnation making it possible to reach the targeted cobalt content of the precatalyst, A stage e) for final drying of the intermediate precatalyst that is obtained at the end of the impregnation stage d), said drying is implemented in the presence of a gas that comprises air and/or an inert gas, with a flow rate of gas per hour and per gram of intermediate precatalyst that is obtained from stage d) (GHSV) of between 1.8 and 6.0 Nl/h/g, and at a temperature of between 110 and 160° C., A stage f) for final calcination of the intermediate precatalyst that is obtained at the end of stage e), said calcination is implemented in the presence of a gas that comprises air and/or an inert gas with a gas flow rate per hour and per gram of intermediate precatalyst that is obtained from stage e) (GHSV) of between 1.5 and 6.0 Nl/h/g, at a temperature of between 200 and 550° C.

Without being connected to any theory, the conditions that are applied for the first stages of drying and calcination promote the formation of large crystallites of cobalt oxide, and the conditions of the final stages of drying and calcination promote the formation of small crystallites of cobalt oxide. Generally, the cobalt oxide is essentially in $Co_3O_4$ oxide form.

Surprisingly enough, it was observed that the precatalyst that is obtained by the method according to the invention has, once activated by reduction, catalytic performances that are improved in the Fischer-Tropsch reaction, in particular in terms of activity and selectivity of C5+ hydrocarbon compounds (i.e., containing 5 and more than 5 carbon atoms per molecule).

Preferably, the impregnation stages a) and/or d) are carried out in the dry state at a temperature of between 15 and 25° C. and preferably between 17 and 23° C.

Preferably, the impregnation stage a) makes possible the deposition of 5 to 8% by weight of cobalt in relation to the final precatalyst weight.

Preferably, the inorganic cobalt precursor that is used in stage a) and/or in stage d) is selected from among cobalt nitrate, cobalt chloride, or cobalt hydroxide or cobalt carbonate, and preferably is cobalt nitrate.

Preferably, the drying stage b) and/or the calcination stage c) are implemented at a flow rate of gas per hour and per gram of intermediate precatalyst (GHSV) of between 0.15 and 1.2 Nl/h/g and preferably between 0.2 and 0.9 Nl/h/g.

Preferably, the drying stage b) is implemented at a temperature of between 60 and 100° C. and preferably between 70 and 90° C.

Preferably, the drying stage b) is implemented with at least one temperature rise slope of between 0.05 to 5° C./minute, and preferably between 0.1 and 2° C./minute, and with a plateau period at the drying temperature of between 1 and 12 hours, and preferably between 2 and 6 hours.

Preferably, the calcination stage c) and/or f) is/are implemented at a temperature of between 250 and 500° C., and preferably between 300 and 450° C.

Preferably, stage c) is implemented with at least one temperature rise slope of between 3 and 20° C./minute, and preferably between 5 and 15° C./minute, and with a plateau period at the calcination temperature of between 1 and 12 hours, and preferably between 2 and 4 hours.

Preferably, the impregnation stage d) makes possible the deposition of 5 to 8% by weight of cobalt in relation to the weight of the final precatalyst.

Preferably, the cobalt content is between 10 and 30% by weight in relation to the weight of the final precatalyst.

In a particular embodiment, the drying stage e) and/or the calcination stage f) is/are implemented at a flow rate of gas per hour and per gram of intermediate precatalyst that is obtained from the preceding stage (GHSV) of between 1.9 and 5.5 Nl/h/g, and preferably between 2.0 and 5.0 Nl/h/g.

Preferably, the drying stage e) is implemented with at least one temperature rise slope of between 0.05 and 5.0° C., and preferably between 0.1 and 2.0° C./minute, and with a plateau period at the drying temperature of between 2 and 16 hours, and preferably between 3 and 8 hours.

Preferably, the drying stage e) is implemented at a temperature of between 110 and 140° C.

Preferably, stage f) is implemented with at least one temperature rise slope of between 0.05 and 1.5° C./minute, preferably between 0.1 and 1.2° C./minute, and with a plateau period at the calcination temperature of [between] 2 and 16 hours, and preferably between 3 and 6 hours.

Preferably, the method comprises, preferably consists of, the following stages:

A first stage a) for impregnation of the porous substrate, by the bringing into contact of at least one solution that comprises at least one inorganic cobalt precursor at a temperature of between 5 and 40° C., with said impregnation making possible the deposition of 2 to 15% by weight of cobalt in relation to the weight of the final precatalyst, A first stage b) for drying the intermediate precatalyst that is obtained at the end of the impregnation stage a), said drying is implemented in the presence of a gas that comprises air and/or an inert gas, with a gas flow rate per hour and per gram of intermediate precatalyst that is obtained from stage a) (GHSV) of between 0.1 and 1.5 Nl/h/g, and at a temperature of between 60 and 110° C., A first stage c) for calcination of the intermediate precatalyst that is obtained at the end of stage b), said calcination is implemented in the presence of a gas that comprises air and/or an inert gas, with a flow rate of gas per hour and per gram of intermediate precatalyst that is obtained from stage b) (GHSV) of between 0.1 and 1.5 Nl/h/g, and at a temperature of between 200 and 550° C., A stage d) for final impregnation of the intermediate precatalyst that is obtained at the end of the calcination stage c), by the bringing into contact of said intermediate precatalyst with at least one solution that comprises at least one inorganic cobalt precursor at a temperature of between 5 and 40° C., with said impregnation making it possible to reach the targeted cobalt content of the precatalyst, A stage e) for final drying of the intermediate precatalyst that is obtained at the end of the impregnation stage d), said drying is implemented in the presence of a gas that comprises air and/or an inert gas, with a flow rate of gas per hour and per gram of intermediate precatalyst that is obtained from stage d) (GHSV) of between 1.8 and 6.0 Nl/h/g, and at a temperature of between 110 and 160° C., A stage f) for final calcination of the intermediate precatalyst that is obtained at the end of stage e), said calcination is implemented in the presence of a gas that comprises air and/or an inert gas at a gas flow rate per hour and per gram of intermediate precatalyst that is obtained from stage e) (GHSV) of between 1.5 and 6.0 Nl/h/g, at a temperature of between 200 and 550° C.

This invention also relates to a precatalyst that can be obtained by the method for preparation of the invention.

This invention also relates to a catalyst that is characterized in that the precatalyst that is obtained by the method for preparation of the invention is subjected to a reduction activation stage that is implemented in the presence of one or more reducing gases, at a temperature of between 300 and 500° C., for a period of between 2 and 20 hours, and at absolute pressures of between 0.1 and 1 MPa.

This invention also relates to a Fischer-Tropsch synthesis method in which the catalyst that is obtained by the method for preparation of the invention is brought into contact with a synthesis gas that contains hydrogen and carbon monoxide, at a total pressure of between 0.1 and 55 MPa, at a temperature of between 180 and 280° C., and at an hourly volumetric flow rate of between 100 and 20,000 volumes of synthesis gas per volume of catalyst and per hour (100 to 20,000 h$^{-1}$).

Definitions and Abbreviations

It is specified that in this entire description, the expression "between . . . and . . . " should be understood as including the above-mentioned limits.

Below, the groups of chemical elements are provided according to the CAS classification (CRC Handbook of Chemistry and Physics, Editor CRC Press, Editor-in-Chief D. R. Lide, 81$^{st}$ Edition, 2000-2001). For example, group VIII according to the CAS classification corresponds to the metals of columns 8, 9 and 10 according to the new IUPAC classification.

The textural and structural properties of the substrate and of the precatalyst that are described below are determined by the methods of characterization that are known to one skilled in the art. The total pore volume and the pore distribution are determined in this invention by nitrogen porosimetry as described in the work "Adsorption by Powders and Porous Solids. Principles, Methodology and Applications," written by F. Rouquérol, J. Rouquérol, and K. Sing, Academic Press, 1999.

Specific surface area is defined as the BET specific surface area (SBET in m2/g) that is determined by nitrogen adsorption in accordance with the standard ASTM D 3663-78 established from the BRUNAUER-EMMETT-TELLER method, described in the periodical "The Journal of American Society," 1938, 60, 309.

Precatalyst is defined as the solid that is obtained at the end of all of the stages of the method according to the invention.

Intermediate precatalyst is defined as the solid that is obtained during the method according to the invention and that has to undergo a subsequent transformation stage.

Catalyst is defined as the solid that is obtained at the end of a reduction activation stage of the precatalyst.

GHSV is defined as the flow rate of gas per hour and per gram of solid that is used at a given stage.

Cobalt oxide is defined as the cobalt that is in CoO form and/or in Co3O4 form.

C5+ hydrocarbons are defined as the hydrocarbons that contain 5 and more than 5 carbon atoms per molecule.

DETAILED DESCRIPTION OF THE INVENTION

In terms of this invention, the various embodiments that are presented can be used by themselves or in combination with one another, with no limit on possible combinations.

The method according to this invention is a method for preparation of a precatalyst that contains a porous substrate and cobalt in oxide form, with the cobalt content being between 5 and 40% by weight in relation to the weight of the precatalyst, with said method comprising at least the following stages:

A first stage a) for impregnation of the porous substrate, by bringing into contact at least one solution that comprises at least one inorganic cobalt precursor at a temperature of between 5 and 40° C., with said impregnation making possible the deposition of 2 to 15% by weight of cobalt in relation to the weight of the final precatalyst, A first stage b) for drying the intermediate precatalyst that is obtained at the end of the impregnation stage a), said drying is implemented in the presence of a gas that comprises air and/or an inert gas, with a flow rate of gas per hour and per gram of intermediate precatalyst that is obtained from stage a) (GHSV) of between 0.1 and 1.5 Nl/h/g, and at a temperature of between 60 and 110° C., A first stage c) for calcination of the intermediate precatalyst that is obtained at the end of stage b), said calcination is implemented in the presence of a gas that comprises air and/or an inert gas, with a flow rate of gas per hour and per gram of intermediate precatalyst that is obtained from stage b) (GHSV) of between 0.1 and 1.5 Nl/h/g, and at a temperature of between 200 and 550° C., A stage d) for final impregnation of the intermediate precatalyst that is obtained at the end of a preceding calcination stage, by bringing into contact said intermediate precatalyst with at least one solution that comprises at least one inorganic cobalt precursor at a temperature of between 5 and 40° C., with said impregnation making it possible to reach the targeted cobalt content of the precatalyst, A stage e) for final drying of the intermediate precatalyst that is obtained at the end of the impregnation stage d), said drying is implemented in the presence of a gas that comprises air and/or an inert gas, with a flow rate of gas per hour and per gram of intermediate precatalyst that is obtained from stage d) (GHSV) of between 1.8 and 60 Nl/h/g, and at a temperature of between 110 and 160° C., A stage f) for final calcination of the intermediate precatalyst that is obtained at the end of stage e), said calcination is implemented in the presence of a gas that comprises air and/or an inert gas with a flow rate of gas per hour and per gram of intermediate precatalyst that is obtained from stage e) (GHSV) of between 1.5 and 6.0 Nl/h/g, at a temperature of between 200 and 550° C.

Porous Substrate

The porous substrate of the precatalyst according to the invention can comprise at least one refractory oxide that is selected from the group that consists of the oxides of magnesium, aluminum, silicon, zirconium, thorium, or titanium, taken by itself or in a mixture with them or with other oxides. Preferably, the porous substrate is an alumina, a silica, or a silica-alumina, and in a particularly preferred manner, the substrate consists of silica-alumina. When the porous substrate comprises alumina, it contains more than 50% by weight of alumina in relation to the weight of the substrate. The alumina can be present in a crystallographic form such as gamma-, delta-, theta-, or alpha-alumina, taken by themselves or in a mixture.

In a preferred case, the porous substrate comprises silica. In this case, it contains more than 50% by weight of silica in relation to the weight of the substrate.

In another preferred case, the porous substrate comprises a silica-alumina. A porous substrate that comprises a silica-alumina is defined as a substrate in which the silicon and the aluminum are in the form of agglomerates of silica or alumina respectively, amorphous aluminosilicate, or any other mixed phase that contains silicon and aluminum, it being understood that the substrate is not mesostructured. Preferably, the alumina and the silica are present in the form of a mixture of SiO2-Al2O3 oxides. The silica content in the silica-alumina substrate varies from 0.5% by weight to 30% by weight, in a preferred manner from 1% by weight to 25% by weight, and in an even more preferred manner from 1.5 to 20% by weight in relation to the weight of the substrate.

Preferably, the porous substrate has a BET surface area of between 5 and 300 m$^2$/g, in an even more advantageous way between 50 and 250 m$^2$/g. The BET specific surface area is measured by nitrogen physisorption. The total pore volume of the substrate is generally between 0.1 and 1.5 cm$^3$/g, preferably between 0.4 and 1 cm$^3$/g, and of which at least 50% of the pore volume is an intra-granular pore volume. The total pore volume is measured by mercury porosimetry according to the standard ASTM D4284-92 with a wetting angle of 140°, for example by means of an Autopore III model device of the trademark Microméritics.

The porous substrate can be put into the form of balls, extrudates, pellets, micrometric powder, irregular and non-spherical agglomerates whose specific shape may result from a crushing stage. In an advantageous manner, said porous substrate comes in the form of micrometric powder with grain sizes of between 1 and 1,000 μm, in a preferred manner between 20 and 200 μm.

First Stage a) for Impregnation of the Porous Substrate

In accordance with the invention, the method for preparation of the precatalyst comprises a first stage a) for impregnation of a porous substrate, selected preferably from among silica, alumina or silica-alumina, by bringing into contact at least one solution that comprises at least one inorganic cobalt precursor at a temperature of between 5 and 40° C., with said impregnation making possible the deposition of 2 to 15% by weight of cobalt in relation to the weight of the final precatalyst.

In particular, said first impregnation stage a) can advantageously be carried out by dry impregnation or by excess impregnation, according to methods that are well known to one skilled in the art. Said first impregnation stage a) is carried out by the bringing into contact of said porous substrate with at least one solution that comprises at least one inorganic cobalt precursor, of which the volume is equal to the pore volume of said porous substrate that is to be impregnated. Said aqueous or organic and preferably aqueous solution contains the inorganic cobalt precursor(s) at the desired concentration to obtain in the intermediate precatalyst a cobalt content that is less than the total targeted content in the final precatalyst.

In accordance with the invention, the cobalt is brought into contact with the substrate by means of any inorganic precursor of soluble cobalt in the aqueous or organic phase and preferably in the aqueous phase. In a preferred manner, the cobalt precursor that is introduced in aqueous or organic solution is preferably in the form of nitrate, chloride, carbonate or hydroxide. Preferably, said cobalt precursor solution is aqueous. The cobalt precursor that is used is preferably cobalt nitrate.

Said first impregnation stage is carried out between 5 and 40° C., in a preferred manner between 15 and 25° C., and in a very preferred manner between 17 and 23° C.

The first stage a) for impregnation of said porous substrate makes possible the deposition of 2 to 15% by weight of cobalt in relation to the weight of the final precatalyst, and preferably 5 to 8% by weight.

Said first stage for impregnation of the substrate of the catalyst that is prepared according to the invention can also advantageously comprise at least one additional stage that consists in depositing at least one additional metal that is selected from among platinum, palladium, rhenium, rhodium, ruthenium, manganese and tantalum, by itself or in a mixture, on said oxide substrate. In a preferred manner, the additional metal is selected from among platinum, ruthenium and rhenium, and in a very preferred manner, the additional metal is platinum. The deposition of the additional metal on the substrate can advantageously be carried out by any method that is known to one skilled in the art, preferably by impregnation of said oxide substrate by at least one solution that contains at least one precursor of said additional metal, and preferably by dry impregnation or by excess impregnation. The additional metal can be impregnated simultaneously with cobalt.

First Stage b) for Drying the Intermediate Precatalyst that is Obtained in Stage a)

In accordance with the invention, the method for preparation of the precatalyst comprises a first stage b) for drying the intermediate precatalyst that is obtained at the end of the impregnation stage a).

The first drying stage b) can be implemented by any means that is known to one skilled in the art and makes it possible to obtain a dried intermediate precatalyst.

Advantageously, the first drying stage b) makes possible the elimination of the solvent from the impregnation solution that is used in stage a). Said first drying stage b) can be implemented in a fixed bed, in a fluidized bed, or in a rotary furnace in the presence of air or of inert gas such as argon, nitrogen, or helium. It is advantageously carried out at atmospheric pressure or at reduced pressure. In a preferred manner, said drying stage is carried out at atmospheric pressure. It is advantageously carried out in a flushed bed. In a very preferred manner, the drying is carried out in a flushed bed in the presence of nitrogen and/or air.

According to the invention, the flow rate of gas per hour and per gram of intermediate precatalyst that is obtained from stage a) (GHSV) that is used during the first drying stage b) on the intermediate precatalyst that is obtained from the first impregnation stage a) is between 0.1 and 1.5 Nl/h/(g of intermediate precatalyst that is obtained from the impregnation stage a)), preferably between 0.15 and 1.2 Nl/h/g, and very preferably between 0.2 and 0.9 Nl/h/g.

Said stage b) is carried out at a temperature of between 60 and 110° C., preferably between 70 and 90° C., optionally with temperature rise slopes of 0.05 to 5.0° C./minute, preferably between 0.1 and 2° C./minute. The drying stage can also take place with at least one plateau period at the drying temperature of between 1 and 12 hours, preferably between 2 and 6 hours.

First Stage c) for Calcination of the Intermediate Precatalyst that is Obtained in Stage b)

In accordance with the invention, the method for preparation of a precatalyst comprises a first stage c) for calcination of the intermediate precatalyst that is obtained at the end of the drying stage b). Said first calcination stage c) can be carried out in a fixed bed, in a fluidized bed, or in a rotary furnace in the presence of air or inert gas such as argon, nitrogen or helium. It is advantageously carried out at atmospheric pressure or at reduced pressure. In a preferred manner, stage c) is carried out at atmospheric pressure. It is advantageously carried out in a flushed bed. In a very preferred manner, the calcination stage is carried out in a flushed bed in the presence of nitrogen and/or air.

Advantageously, the first calcination stage c) is carried out without unloading the catalyst after the drying stage b) in the event where said stages b) and c) are implemented in the same tool.

According to the invention, the flow rate of gas per hour and per gram of intermediate precatalyst that is obtained from stage b) (GHSV) that is used during stage c) for calcination of the intermediate precatalyst that is obtained from the drying stage b) is between 0.1 and 1.5 Nl/h/(g of intermediate precatalyst that is obtained from the drying stage b)), preferably between 0.15 and 1.2 Nl/h/g, and very preferably between 0.2 and 0.9 Nl/h/g.

The calcination stage c) is carried out at a temperature of between 200 and 550° C., preferably 250 and 500° C., and very preferably between 300 and 450° C., and optionally by using temperature rise slopes of between 3 and 20° C./minute, preferably between 5 and 15° C./minute. The calcination stage can also be implemented with at least a plateau at the calcination temperature and whose duration is between 1 and 12 hours, preferably between 2 and 4 hours.

The cobalt that is contained in the intermediate precatalyst that is obtained at the end of stages a), b) and c) is in oxide form. The solid therefore has crystallites of cobalt oxide on substrate, with a large majority of the cobalt oxide being in $Co_3O_4$ form. With a large majority means that 95% by weight of cobalt is present in $Co_3O_4$ form.

Stage d) for Final Impregnation of the Intermediate Precatalyst that is Obtained in a Preceding Calcination Stage In accordance with the invention, the catalyst preparation method comprises a stage d) for final impregnation of cobalt on the intermediate precatalyst that is obtained at the end of a preceding calcination stage, preferably at the end of stage c). The addition of cobalt to the porous substrate is carried out by impregnation on the porous substrate of at least one solution that contains at least one inorganic cobalt precursor.

Said final impregnation stage d) can advantageously be carried out by dry impregnation or by excess impregnation or according to any other methods that are known to one skilled in the art. In a preferred manner, said impregnation stage is carried out by dry impregnation, preferably at a temperature of between 5 and 40° C., preferably between 15 and 25° C., and in a preferred manner between 17 and 23° C., and in a very preferred manner at a temperature that is equal to 20° C.

Said final impregnation stage d) is carried out in such a way as to reach the targeted cobalt content in the final precatalyst.

In accordance with the invention, the inorganic cobalt precursor is an inorganic compound, which is preferably selected from among the nitrate of cobalt, chloride, carbonate or hydroxide, and very preferably the inorganic compound is cobalt nitrate.

Advantageously, the cobalt is brought into contact with the porous substrate by means of an aqueous solution of cobalt nitrate.

Said stage for impregnation of the porous substrate of the precatalyst that is prepared according to the invention can advantageously comprise at least one additional stage that consists in depositing at least one additional metal that is selected from among platinum, palladium, rhenium, rhodium, ruthenium, manganese and tantalum, by itself or in a mixture, on said oxide substrate. In a preferred manner, the additional metal is selected from among platinum, ruthenium, and rhenium, and in a very preferred manner, the additional metal is platinum. The deposition of the additional metal on the substrate can advantageously be carried out by any method that is known to one skilled in the art, preferably by impregnation of said oxide substrate by at least one solution that contains at least one precursor of said additional metal, and preferably by dry impregnation or by excess impregnation. The additional metal can be impregnated simultaneously with the cobalt. Preferably, the final impregnation stage d) of said porous substrate makes possible the deposition of 2 to 15% by weight and preferably 5 to 8% by weight of cobalt in relation to the weight of the final precatalyst.

Stage e) for Final Drying of the Intermediate Precatalyst that is Obtained in Stage d)

In accordance with the invention, the method for preparation of the catalyst comprises a stage e) for final drying of the intermediate precatalyst that is obtained at the end of the final impregnation stage d).

The final drying stage e) can be implemented by any means that is known to one skilled in the art and makes it possible to obtain a dried intermediate precatalyst. Advantageously, the final drying stage e) makes possible the elimination of the solvent from the impregnation solution that is used in stage d).

More particularly, said drying stage can be implemented in a fixed bed, in a fluidized bed, or in a rotary furnace in the presence of air or inert gas such as argon, nitrogen, or helium. It is advantageously carried out at atmospheric pressure or at reduced pressure. In a preferred manner, this stage is carried out at atmospheric pressure. In a very preferred manner, the drying is carried out in a flushed bed in the presence of nitrogen and/or air.

According to the invention, the flow rate of gas per hour and per gram of intermediate precatalyst that is obtained from the impregnation stage d) (GHSV) that is used during the drying stage e) in the intermediate precatalyst that is obtained from the first impregnation stage d) is between 1.8 and 6.0 Nl/h/g of intermediate precatalyst that is obtained at the end of the impregnation stage d), preferably between 1.9 and 5.5 Nl/h/g, and very preferably between 2.0 and 5.0 Nl/h/g.

Said final drying stage e) is carried out at a temperature of between 110 and 160° C. and preferably between 110 and 140° C. This drying stage can implement one or more temperature rise slopes of between 0.05 and 5.0° C./minute, and preferably between 0.1 and 2.0° C./minute. It can also be carried out with at least one plateau at the drying temperature that is generally between 2 and 16 hours, preferably between 3 and 8 hours.

Stage f) for Final Calcination of the Intermediate Precatalyst that is Obtained in Stage e)

In accordance with the invention, the catalyst preparation method comprises a stage f) for final calcination of the intermediate precatalyst that is obtained at the end of the final drying stage e).

Said final calcination stage f) can be carried out in a fixed bed, in a fluidized bed, or in a rotary furnace in the presence of air or inert gas, such as argon, nitrogen or helium. It is advantageously carried out at atmospheric pressure, or at reduced pressure. In a very preferred manner, this stage f) is carried out at atmospheric pressure. In a preferred manner, when the calcination stage is carried out in a fixed bed, the gas that is used is either air or an inert gas such as argon, nitrogen, or helium. In a very preferred manner, the calcination stage is carried out in a flushed bed in the presence of nitrogen and/or air.

Advantageously, the final calcination stage f) can be carried out without unloading the catalyst after the drying stage e) in the event where said stages e) and f) are implemented in the same tool.

According to the invention, the flow rate of gas per hour and per gram of intermediate precatalyst that is obtained from stage e) (GHSV) that is used during the calcination stage f) in the intermediate precatalyst that is obtained from the drying stage e) is between 1.5 and 6.0 Nl/h/g of intermediate precatalyst that is obtained from the drying stage e), preferably between 1.9 and 5.5 Nl/h/g, and very preferably between 2.0 and 5.0 Nl/h/g.

The final calcination stage f) is carried out at temperatures of between 200 and 550° C., preferably 250 and 500° C., and very preferably between 300 and 450° C. The calcination stage can use one or more temperature rise slopes of between 0.05 and 1.5° C./minute, preferably between 0.1 and 1.2° C./minute. It is also possible to apply at least one plateau to the calcination temperature whose duration is between 2 and 16 hours, preferably between 3 and 6 hours.

The precatalyst that is obtained at the end of the preparation method according to this invention is in oxide form after the stages of impregnation, drying and calcination are concatenated. Said precatalyst therefore has crystallites of cobalt oxide on substrate.

It should be noted that the method according to the invention does not exclude the presence of other additional intermediate stages for impregnation of cobalt, drying and calcination, which are carried out between stages c) and d).

According to the invention, the final cobalt content of the final precatalyst is between 5 and 40% by weight of cobalt, preferably between 10 and 30% by weight of cobalt in relation to the total weight of the final precatalyst.

In a preferred mode of the invention, the method is carried out in such a way that the final cobalt content is reached in two impregnation stages of cobalt, therefore by carrying out stages a), b), c), d), e) and f) in succession.

Use of the Precatalyst in a Fischer-Tropsch Synthesis Method

Another object of the invention relates to the use of the precatalyst that is obtained by the method according to the invention in a Fischer-Tropsch synthesis method.

Prior to its use in a catalytic reactor for the Fischer-Tropsch synthesis, said precatalyst that is obtained by the method according to this invention is subjected to at least one reduction activation stage. Said reduction stage is intended to form metal particles of cobalt in the zero-valence state, and is carried out at high temperature in the presence of at least one reducing gas, for example containing hydrogen, pure or diluted by an inert gas.

The reduction stage makes it possible to carry out the following reaction:

Co3O4→CoO→Co(0)

Said reduction stage is performed at a temperature of between 300 and 500° C. and for a duration of between 2 and 20 hours. It is generally carried out in a fixed-bed or fluidized-bed reactor at absolute pressures of between 0.1 and 1 MPa.

At the end of the reduction stage, the activated catalyst is generally protected from any oxidizing environment. For this purpose, said activated catalyst can be unloaded from the reduction reactor, optionally under inert atmosphere, in an organic solvent so as to prevent its reoxidation before being engaged in the Fischer-Tropsch reaction.

The activated catalyst (in reduced form) is advantageously used in a Fischer-Tropsch synthesis method that leads to the production of essentially linear and saturated C5+ hydrocarbons (having at least 5 carbon atoms per molecule) starting from synthesis gas. The hydrocarbons that are produced by the method of the invention are preferably essentially paraffinic hydrocarbons, of which the fraction that has the highest boiling points can be converted with a high yield into middle distillates (diesel fuel and kerosene fractions) by a hydroconversion method such as catalytic hydrocracking and/or catalytic hydroisomerization.

The feedstock that is used for implementing the Fischer-Tropsch synthesis method is a synthesis gas that comprises in particular carbon monoxide and hydrogen and that has an $H_2/CO$ molar ratio of between 0.5 and 4, and preferably between 1.6 and 2.2. The synthesis gas is, for example, obtained from a method for vaporeforming hydrocarbons or alcohol or from a method for partial oxidation of hydrocarbons (e.g., methane), or else from a method for autothermic reforming of hydrocarbons (e.g., methane) or finally from a method for gasification of carbon.

The catalyst that is used in the method for synthesis of hydrocarbons according to the invention can be used in various types of reactors, for example in a fixed bed, in a moving bed, in a boiling bed or else in a three-phase fluidized bed. The use of the catalyst in suspension in a three-phase fluidized reactor, preferably of the bubble-column type, is preferred. In this preferred use of the catalyst, said catalyst is divided into the very fine powder state, particularly on the order of several tens of microns, with this powder forming a suspension with the reaction medium. This technology is also known under the terminology of the "slurry" method by one skilled in the art.

The method for synthesis of hydrocarbons according to the invention is implemented in the presence of synthesis gas, at a total pressure of between 0.1 and 15 MPa, preferably between 0.5 and 10 MPa, at a temperature of between 150 and 350° C., preferably between 180 and 250° C. The hourly volumetric flow rate is advantageously between 100 and 20,000 volumes of synthesis gas per volume of catalyst and per hour (100 to 20,000 h−1) and preferably between 400 and 10,000 volumes of synthesis gas per volume of catalyst and per hour (400 to 10,000 $h^{-1}$).

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 1752676, filed Mar. 30, 2017 are incorporated by reference herein.

EXAMPLES

The following examples demonstrate the performance gains of the catalysts according to the invention.

The cobalt content in the final precatalyst is determined by X fluorescence.

The mean size of cobalt crystallites in $Co_3O_4$ form is calculated from the Scherrer Equation, applied to the most intense peak (3 1 1) of diffraction (2θ=26.9°) of the X rays that are applied to the sample.

Example 1: Precatalyst A2 According to the Invention

An intermediate precatalyst A1 that comprises the cobalt that is deposited on a silica-alumina substrate is prepared by a first dry impregnation, at a temperature of 20° C., of an aqueous solution of cobalt nitrate in such a way as to deposit on the order of 8% by weight of cobalt on a silica-alumina powder (Siralox5™) with a mean grain size that is equal to 80 μm, with a specific surface density of 170 $m^2/g$, and a pore volume that is measured by nitrogen adsorption isotherm at 0.55 ml/g.

After a first dry impregnation, the intermediate precatalyst is subjected to a first drying stage in a fluidized-bed reactor in air in the presence of a GHSV of 0.7 Nl/h/g of intermediate precatalyst. The temperature is brought from 20 to 80° C. with a rate of climb of 1.5° C./minute. The temperature is kept at 80° C. for 4 hours. The temperature of the intermediate precatalyst is then brought to 400° C. with a rate of climb of 15° C./minute in the presence of a GHSV of 0.7 Nl/h/g of substrate. The temperature of 400° C. is kept for 4 hours. The intermediate precatalyst A1 contains approximately 8% by weight of cobalt in relation to the weight of the intermediate precatalyst.

The intermediate precatalyst A1 is subjected to a final dry impregnation stage, at a temperature of 20° C., by means of an aqueous solution of cobalt nitrate. The intermediate precatalyst is dried in a fluidized-bed reactor in air in the presence of a GHSV of 3 Nl/h/g of intermediate precatalyst by bringing the temperature from 20 to 120° C. with a rate of climb of 1.5° C./minute. The temperature is then kept at 120° C. for 4 hours. The temperature of the intermediate precatalyst is then brought to 400° C. with a rate of climb of 1° C./minute in the presence of a GHSV of 3 Nl/h/g of intermediate precatalyst. The temperature is kept at 400° C. for 4 hours. This final calcination stage makes it possible to obtain the final precatalyst A2 that contains 15% by weight of cobalt in relation to the weight of the precatalyst A2.

To obtain an active catalyst A in the Fischer-Tropsch reaction, the precatalyst A2 is subjected to a reduction activation stage under pure hydrogen at 400° C. for 16 hours, in the presence of a GHSV of 2 Nl/h/g of precatalyst A2.

Example 2: Precatalyst B2 (for Comparison)

An intermediate precatalyst B1 that comprises cobalt that is deposited on a silica-alumina substrate is prepared by a first dry impregnation, at a temperature of 20° C., of an aqueous solution of cobalt nitrate in such a way as to deposit on the order of 8% by weight of cobalt on a silica-alumina powder (Siralox5™) with a mean grain size that is equal to 80 μm, a specific surface density of 170 $m^2/g$, and a pore volume that is measured by nitrogen adsorption isotherm at 0.55 ml/g.

After a first dry impregnation, the intermediate precatalyst is dried in a fluidized-bed reactor under air in the presence of a GHSV of 0.7 Nl/h/g of intermediate precatalyst. The temperature is brought from 20 to 80° C. with a rate of climb of 1.5° C./minute. The temperature is kept at 80° C. for 4 hours. The temperature of the intermediate precatalyst is then brought to 400° C. with a rate of climb of 15° C./minute in the presence of a GHSV of 0.7 Nl/h/g/of intermediate precatalyst. The temperature is kept at 400° C. for 4 hours. The intermediate precatalyst B1 contains approximately 8% by weight of cobalt in relation to the weight of the intermediate precatalyst.

The intermediate precatalyst B1 is subjected to a final dry impregnation stage, at a temperature of 20° C., by means of an aqueous solution of cobalt nitrate. The intermediate precatalyst is dried in a fluidized-bed reactor under air in the presence of a GHSV of 0.7 Nl/h/g of intermediate precatalyst. The temperature is brought from 20 to 80° C. with a rate of climb of 1.5° C./minute. The temperature is kept at 80° C. for 4 hours. The temperature of the intermediate precatalyst is then brought to 400° C. with a rate of climb of 15° C./minute in the presence of a GHSV of 0.7 Nl/h/g of intermediate precatalyst. The temperature is kept at 400° C. for 4 hours. This final calcination stage makes it possible to obtain the final precatalyst B2 that contains 15% by weight of cobalt in relation to the weight of the precatalyst B2.

To obtain an active catalyst B in the Fischer-Tropsch reaction, the precatalyst B2 is subjected to reduction activation under pure hydrogen at 400° C. for 16 hours, in the presence of a GHSV of 2 Nl/h/g of precatalyst B2.

Example 3: Precatalyst C2 (for Comparison)

An intermediate precatalyst C1 that comprises cobalt that is deposited on a silica-alumina substrate is prepared by a first dry impregnation, at a temperature of 20° C., of an aqueous solution of cobalt nitrate in such a way as to deposit on the order of 8% by weight of cobalt oxide on a silica-alumina powder (Siralox5™) with a mean grain size that is equal to 80 μm, with a surface density of 170 $m^2/g$, and a pore volume that is measured by nitrogen adsorption isotherm at 0.55 ml/g.

After a first dry impregnation, the intermediate precatalyst is dried in a fluidized-bed reactor under air in the presence of a GHSV of 3 Nl/h/g of intermediate precatalyst. The temperature is brought from 20 to 120° C. with a rate of climb of 1.5° C./minute. The temperature is kept at 120° C. for 4 hours. The temperature of the intermediate precatalyst is then brought to 400° C. with a rate of climb of 1° C./minute in the presence of a GHSV of 3 Nl/h/g of intermediate precatalyst. The temperature is kept at 400° C. for 4 hours. The intermediate precatalyst C1 contains approximately 8% by weight of cobalt in relation to the weight of the intermediate precatalyst.

The intermediate precatalyst C1 is subjected to a final dry impregnation stage, at a temperature of 20° C., by means of an aqueous solution of cobalt nitrate. The intermediate precatalyst is dried in a fluidized-bed reactor under air in the presence of a GHSV of 0.7 Nl/h/g of intermediate precatalyst. The temperature is brought from 20 to 80° C. with a rate of climb of 1.5° C./minute. The temperature is kept at 80° C. for 4 hours. The temperature of the intermediate precatalyst is then brought to 400° C. with a rate of climb of 15° C./minute in the presence of a GHSV of 0.7 Nl/h/g of intermediate precatalyst. The temperature is kept at 400° C. for 4 hours. This final calcination stage makes it possible to obtain the final precatalyst C2 that contains 15% by weight of cobalt in relation to the weight of the final precatalyst C2.

To obtain an active catalyst C in the Fischer-Tropsch reaction, the precatalyst C2 is subjected to reduction activation under pure hydrogen at 400° C. for 16 hours, in the presence of a GHSV of 2 Nl/h/g of precatalyst C2.

Example 4: Precatalyst D2 (for Comparison)

An intermediate precatalyst D1 that comprises cobalt that is deposited on a silica-alumina substrate is prepared by dry impregnation, at a temperature of 20° C., of an aqueous cobalt nitrate solution in such a way as to deposit on the order of 8% by weight of cobalt oxide on a silica-alumina powder (Siralox5™) of a mean grain size that is equal to 80 µm, with a surface density of 170 m²/g and a pore volume that is measured by nitrogen adsorption isotherm at 0.55 ml/g.

After a first dry impregnation, the intermediate precatalyst is dried in a fluidized-bed reactor under air in the presence of a GHSV of 3 Nl/h/g of intermediate precatalyst. The temperature is brought from 20 to 120° C. with a rate of climb of 1.5° C./minute. The temperature is kept at 120° C. for 4 hours. The temperature of the intermediate precatalyst is then brought to 400° C. with a rate of climb of 1° C./minute in the presence of a GHSV of 3 Nl/h/g of intermediate precatalyst. The temperature is kept at 400° C. for 4 hours. The intermediate precatalyst D1 contains approximately 8% by weight of cobalt in relation to the weight of the intermediate precatalyst.

The intermediate precatalyst D1 is subjected to a final dry impregnation stage, at a temperature of 20° C., by means of an aqueous cobalt nitrate solution. The intermediate precatalyst is dried in a fluidized-bed reactor under air in the presence of a GHSV of 3 Nl/h/g of intermediate precatalyst. The temperature is brought from 20 to 120° C. with a rate of climb of 1.5° C./minute. The temperature is kept at 120° C. for 4 hours. The temperature of the intermediate precatalyst is then brought to 400° C. with a rate of climb of 1° C./minute in the presence of a GHSV of 3 Nl/h/g of intermediate precatalyst. The temperature is kept at 400° C. for 4 hours. This final calcination stage makes it possible to obtain the final precatalyst D2 that contains 15% by weight of cobalt in relation to the weight of the final precatalyst D2.

To obtain an active catalyst D in the Fischer-Tropsch reaction, the precatalyst D2 is subjected to reduction activation under pure hydrogen at 400° C. for 16 hours, in the presence of a GHSV of 2 Nl/h/g of precatalyst D2.

The sizes of the crystallites that are obtained for all of the precatalysts by X-ray diffraction are provided below.

TABLE 1

| | Catalyst | Mean Size of Co3O4 Crystallites (nm) |
|---|---|---|
| According to the Invention | Intermediate Precatalyst A1 | 20.3 |
| | Precatalyst A2 | 18.4 |
| For Comparison | Intermediate Precatalyst B1 | 19.3 |
| | Precatalyst B2 | 20.7 |
| For Comparison | Intermediate Precatalyst C1 | 12.4 |
| | Precatalyst C2 | 16.3 |
| For Comparison | Intermediate Precatalyst D1 | 12.1 |
| | Precatalyst D2 | 13.3 |

Use of the Catalyst in the Fischer-Tropsch Synthesis

The catalyst is used in the Fischer-Tropsch synthesis reaction in the following way. The reduced catalyst that is protected from reoxidation by a solvent of paraffinic nature is introduced into a continuous reactor, i.e., in which the reagents continuously enter and the products and the reagents that are not converted continuously exit from the stirred reactor, said reactor is filled with commercial wax (Duracyne) at a temperature of 110° C., and the test is then started up by injection of syngas, under the following conditions:
Temperature=220° C.
Total pressure=2 MPa
H2/CO molar ratio=2

The test conditions are adjusted by modifying the flow rate of synthesis gas in such a way as to reach a constant CO conversion regardless of the activity of the catalyst and regardless of its deactivation level during the test.

The activities of the catalysts A, B, C and D are calculated in relation to a reference catalyst whose activity is 100%.

The in-line analysis of the gaseous effluents makes it possible to determine the conversion of CO, as well as the selectivities of light products (C1-C5), in particular the selectivity of methane and the selectivity of C5+ (products that contain more than 5 carbon atoms).

TABLE 2

| Catalyst | Relative Activity (%) | C5+ Selectivity (%) | Mean Size of Crystallites Measured by XRD (nm) of the Final Precatalysts (±10%) |
|---|---|---|---|
| Catalyst A (According to the Invention) | 400 | 84.2 | 18.4 (A2) |
| Catalyst B (For Comparison) | 300 | 81.8 | 20.7 (B2) |
| Catalyst C (For Comparison) | 320 | 81.7 | 16.3 (C2) |
| Catalyst D (For Comparison) | 440 | 80.9 | 13.3 (D2) |

The advantage of the method for preparation of the precatalyst according to the invention resides in the selection of specific conditions for the first stages and the final stages of drying and calcination that makes it possible to obtain particles of cobalt oxide ($Co_3O_4$) that improve the selectivities of long-chain paraffinic molecules, while preserving a good activity.

The implementation, in Example 2, of identical conditions for the first stages and the final stages of drying and calcination does not make it possible to obtain as active and selective a catalyst when the concatenation of the stages of the method according to the invention is carried out under very specific conditions that are used in Example 1. In addition, although the precatalysts A2 and B2 have equivalent mean sizes of $Co_3O_4$ crystallites, the catalyst A has a C5+ activity and selectivity that are improved in relation to the catalyst B.

From the results that are obtained with catalysts C and D (Table 2), it is clearly evident that the implementation of the same operating conditions for the drying and calcination stages but with a different concatenation from that of this invention leads to less selective C5+ catalysts in relation to catalyst A.

Thus, it clearly appears that the implementation of the preparation method according to the invention under the conditions and according to the concatenation of specific conditions of the invention is crucial and makes it possible to improve the catalytic selectivity and activity in the Fischer-Tropsch reaction.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A method for preparation of a precatalyst that contains a porous substrate and cobalt in oxide form, with the cobalt content being between 5 and 40% by weight in relation to the weight of the precatalyst, with said method comprising at least the following stages:
   A first stage a) for impregnation of the porous substrate, by bringing into contact at least one solution that comprises at least one inorganic cobalt precursor at a temperature of between 5 and 40° C., with said impregnation making possible the deposition of 2 to 15% by weight of cobalt in relation to the weight of the final precatalyst,
   A first stage b) for drying the intermediate precatalyst that is obtained at the end of the impregnation stage a), said drying is implemented in the presence of a gas that comprises air and/or an inert gas, with a flow rate of gas per hour and per gram of intermediate precatalyst that is obtained from stage a) (GHSV) of between 0.1 and 1.5 Nl/h/g, and at a temperature of between 60 and 110° C.,
   A first stage c) for calcination of the intermediate precatalyst that is obtained at the end of stage b), said calcination is implemented in the presence of a gas that comprises air and/or an inert gas, with a flow rate of gas per hour and per gram of intermediate precatalyst that is obtained from stage b) (GHSV) of between 0.1 and 1.5 Nl/h/g, and at a temperature of between 200 and 550° C.,
   optionally conducting one or more additional sets of steps a), b) and c),
   A final impregnation stage d) of the intermediate precatalyst that is obtained at the end of the last calcination stage c), by bringing said intermediate precatalyst into contact with at least one solution that comprises at least one inorganic cobalt precursor at a temperature of between 5 and 40° C., with said impregnation making it possible to reach the targeted cobalt content of the precatalyst,
   A final drying stage e) of the intermediate precatalyst that is obtained at the end of the impregnation stage d), said drying is implemented in the presence of a gas that comprises air and/or an inert gas, with a flow rate of gas per hour and per gram of intermediate precatalyst that is obtained from stage d) (GHSV) of between 1.8 and 6.0 Nl/h/g, and at a temperature of between 110 and 160° C.,
   A final calcination stage f) of the intermediate precatalyst that is obtained at the end of stage e), said calcination is implemented in the presence of a gas that comprises air and/or an inert gas, with a flow rate of gas per hour and per gram of intermediate precatalyst that is obtained from stage e) (GHSV) of between 1.5 and 6.0 Nl/h/g, at a temperature of between 200 and 550° C.

2. A method according to claim 1, in which at least one of the impregnation stages a) and/or d) are carried out in the dry state, at a temperature of between 15 and 25° C.

3. The method according to claim 2, wherein the impregnation stages a) and/or d) are carried out in the dry state, at a temperature of between 17 and 23° C.

4. A method according to claim 1, in which one or more of the impregnation stages a) makes possible the deposition of 5 to 8% by weight of cobalt in relation to the weight of the final precatalyst.

5. A method according to claim 1, in which one or more of the drying stages b) and/or the calcination stages c) are implemented at a flow rate of gas per hour and per gram of intermediate precatalyst (GHSV) of between 0.15 and 1.2 Nl/h/g.

6. The method according to claim 5, wherein the drying stage b) and/or the calcination stage c) are implemented at a flow rate of gas per hour and per gram of intermediate precatalyst (GHSV) of between 0.2 and 0.9 Nl/h/g.

7. A method according to claim 1, in which one or more of the drying stages b) is implemented at a temperature of between 60 and 100° C.

8. The method according to claim 7, wherein the drying stage b) is implemented at a temperature of between 70 and 90° C.

9. A method according to claim 1, in which one or more of the drying stages b) is implemented with at least one temperature rise slope of between 0.05 to 5° C./minute, and with at least one plateau period at the drying temperature of between 1 and 12 hours.

10. The method according to claim 9, wherein the drying stage b) is implemented with at least one temperature rise slope of between 0.1 and 2° C./minute, and with at least one plateau period at the drying temperature of between 2 and 6 hours.

11. A method according to claim 1, in which one or more of stages c) is implemented with at least one temperature rise slope of between 3 and 20° C./minute, and with at least one plateau period at the calcination temperature of between 1 and 12 hours.

12. The method according to claim 11, wherein stage c) is implemented with at least one temperature rise slope of between 5 and 15° C./minute, and with at least one plateau period at the calcination temperature of between 2 and 4 hours.

13. A method according to claim 1, in which the impregnation stage d) makes possible the deposition of 5 to 8% by weight of cobalt in relation to the final precatalyst weight.

14. A method according to claim 1, in which the cobalt content is between 10 and 30% by weight in relation to the weight of the final precatalyst.

15. A method according to claim 1, in which the drying stage e) is implemented with at least one temperature rise slope of between 0.05 and 5.0° C. and with at least one plateau period at the drying temperature of between 2 and 16 hours.

16. A method according to claim 1, in which the calcination stage f) is implemented with at least one temperature rise slope of between 0.05 and 1.5° C./minute, and with a plateau period at the calcination temperature of between 2 and 16 hours.

17. A precatalyst obtained by the preparation method according to claim 1.

18. A catalyst obtained by a method comprising subjecting the precatalyst according to claim 17 to a reduction activation stage that is implemented in the presence of one or more reducing gases, at a temperature of between 300 and 500° C. and for a period of between 2 and 20 hours, at absolute pressures of between 0.1 and 1 MPa.

19. A Fischer-Tropsch synthesis method comprising bringing into contact the catalyst according to claim 18 with a synthesis gas that contains hydrogen and carbon monoxide, at a total pressure of between 0.1 and 55 MPa, at a temperature of between 180 and 280° C., and at an hourly volumetric flow rate of between 100 and 20,000 volumes of synthesis gas per volume of catalyst and per hour.

20. A method for preparation of a precatalyst that contains a porous substrate and cobalt in oxide form, with cobalt content being between 5 and 40% by weight in relation to the weight of the precatalyst, with said method comprising at least the following stages:

Only one first stage a) for impregnation of the porous substrate, by bringing into contact at least one solution that comprises at least one inorganic cobalt precursor at a temperature of between 5 and 40° C., with said impregnation making possible the deposition of 2 to 15% by weight of cobalt in relation to the weight of the final precatalyst, Only one first stage b) for drying the intermediate precatalyst that is obtained at the end of the impregnation stage a), said drying is implemented in the presence of a gas that comprises air and/or an inert gas, with a flow rate of gas per hour and per gram of intermediate precatalyst that is obtained from stage a) (GHSV) of between 0.1 and 1.5 Nl/h/g, and at a temperature of between 60 and 110° C., Only one first stage c) for calcination of the intermediate precatalyst that is obtained at the end of stage b), said calcination is implemented in the presence of a gas that comprises air and/or an inert gas, with a flow rate of gas per hour and per gram of intermediate precatalyst that is obtained from stage b) (GHSV) of between 0.1 and 1.5 Nl/h/g, and at a temperature of between 200 and 550° C., A stage d) for final impregnation of the intermediate precatalyst that is obtained in the only one calcination stage c), by bringing into contact said intermediate precatalyst with at least one solution that comprises at least one inorganic cobalt precursor at a temperature of between 5 and 40° C., with said impregnation making it possible to reach the targeted cobalt content of the precatalyst, A stage e) for final drying of the intermediate precatalyst that is obtained at the end of the impregnation stage d), said drying is implemented in the presence of a gas that comprises air and/or an inert gas, with a flow rate of gas per hour and per gram of intermediate precatalyst that is obtained from stage d) (GHSV) of between 1.8 and 6.0 Nl/h/g, and at a temperature of between 110 and 160° C., A stage f) for final calcination of the intermediate precatalyst that is obtained at the end of stage e), said calcination is implemented in the presence of a gas that comprises air and/or an inert gas, with a flow rate of gas per hour and per gram of intermediate precatalyst that is obtained from stage e) (GHSV) of between 1.5 and 6.0 Nl/h/g, at a temperature of between 200 and 550° C.

* * * * *